(12) United States Patent
Zelesko et al.

(10) Patent No.: US 8,819,718 B2
(45) Date of Patent: Aug. 26, 2014

(54) METHODS AND APPARATUS FOR MONITORING AND/OR COLLECTING VIEWERSHIP STATISTICS

(75) Inventors: Matthew Zelesko, Doylestown, PA (US); Ranga Muvavarirwa, Denver, CO (US); Ethan Lawrence Wolf, Aurora, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/564,684

(22) Filed: Aug. 1, 2012

(65) Prior Publication Data
US 2014/0040934 A1    Feb. 6, 2014

(51) Int. Cl.
H04H 60/32    (2008.01)
H04N 7/167    (2011.01)
H04N 21/258   (2011.01)
H04N 21/45    (2011.01)

(52) U.S. Cl.
CPC ..... H04N 21/25883 (2013.01); H04N 21/4532 (2013.01)
USPC .................. 725/20; 725/14; 725/31

(58) Field of Classification Search
CPC ............... H04N 21/25883; H04N 21/4532
USPC ............................................ 725/14, 31
See application file for complete search history.

(56) References Cited

U.S. PATENT DOCUMENTS

| | | | |
|---|---|---|---|
| 2004/0064714 A1* | 4/2004 | Carr | 713/193 |
| 2007/0011040 A1* | 1/2007 | Wright et al. | 705/10 |
| 2007/0186229 A1* | 8/2007 | Conklin et al. | 725/14 |
| 2012/0159528 A1* | 6/2012 | Toney, Jr. | 725/14 |
| 2012/0254910 A1* | 10/2012 | Donoghue et al. | 725/14 |

\* cited by examiner

Primary Examiner — Mark D Featherstone
Assistant Examiner — Tien M Nguyen
(74) Attorney, Agent, or Firm — Straub & Pokotylo; Michael P. Straub; Stephen T. Straub

(57) ABSTRACT

Methods and apparatus for collecting program viewership information are described. A viewership monitoring module is provided access to decrypted program content allowing program information to be recovered without having to capture output program content using a microphone or camera. The monitoring module is loaded onto a secure device, e.g., a home network device, such as a router used to deliver content to a secure playback device. Alternatively the secure device which performs the monitoring maybe the secure playback device. Since a user of the secure device or a company implementing the viewership monitoring process loads the monitoring module onto the secure device, the network used to deliver the secure content need not be informed of which network customers are contributing to the viewership information which is being collected.

20 Claims, 8 Drawing Sheets

METHODS AND APPARATUS FOR MONITORING AND/OR COLLECTING VIEWERSHIP STATISTICS

FIELD OF THE INVENTION

Various embodiments of the present invention are related to cable network systems, and more particularly, to method and apparatus for monitoring and collecting content viewership information to generate viewership statistics.

BACKGROUND OF THE INVENTION

The collection of content presentation, e.g., viewership, information is important to networks, advertisers, content delivery companies and many other entities for a variety of purposes and applications.

Traditionally, companies such as the Nielsen, relied on a group of viewers to keep a manual log of what they watched and when. The log information was collected and then compiled to generate program viewership information which might be reflected as TV viewership ratings and which also provided information about the number and age of viewers watching the programs.

The viewership information collected by ratings companies is often used for targeting advertisements, determining what TV shows are maintained or dropped by a TV network and for a wide variety of other applications.

While Television (TV) was and remains an important target for ratings services, as the distribution and presentation of a wide variety of programs has migrated to a wide variety of user devices in addition to TVs, there has been a growing need for methods and apparatus to track viewership information on a wide variety of different customer devices, e.g., handheld devices, personal computers, tablets, etc.

While content delivery network operators, e.g. cable companies, can track viewer information since the content delivery network is often able to track which content is being delivered to individual set top boxes or other customer premise devices, the information which is available to the content delivery network operator is normally prohibited to being distributed without express consent of the customer to which the content is delivered. Thus, even if a content delivery network has detailed content and/or viewing information they normally are prohibited from sharing such information with an outside ratings company.

While it might seem that a rating company could obtain authorization from the viewers who provide it with viewing information, this is often not a practical solution given that it would require the rating company to provide information about the viewers it is monitoring to generate the ratings statistics with the content delivery company, e.g., cable network operator. Ratings companies tend to try and keep the identify of the viewers who contribute to the ratings a carefully guarded secret to avoid a TV network or program producers targeting and/or somehow influencing the relatively limited set of viewers upon which the ratings are generated which are intended to be representative of the much larger viewing audience.

In order to overcome various problems, e.g., manual viewer tracking and reporting requirements, of the log approach to obtaining viewership information, audio watermarking techniques have been used to embed content identification information into programs which are broadcast by TV and Radio broadcasters and/or other content distributors. The audio watermarks, while not being detectable by the human ear, can be detected by a machine which processes an electronic version of an audio signal including the audio watermark.

In analog systems, the analog audio signal in electrical form may be monitored to detect the audio watermark. Simple signal pass through devices have been developed to be placed between the output of a set top box and the analog audio/video input of a television to monitor viewing of content that includes audio watermarks.

While the audio watermarking has served well in the context of analog systems, advances in digital communications technology have made it difficult to use with current content delivery networks. This is because the content is often encrypted while being communicated over the network and/or between secure devices. Thus, if a simple pass through monitoring device is used in many modern digital networks, it will simply observe encrypted digital data and be unable to identify the content being delivered based on the audio watermarks due to the encryption of the program content.

While the program content maybe decrypted in a secure playback device, the interface to the output device is often secure or integrated into the playback device eliminating the analog signal path into which an analog signal monitoring device may have previously been inserted.

In an attempt to overcome the problem presented by a lack of an analog audio signal interface into which a monitoring device can easily be inserted, the audio output of a playback device is monitored in some systems using a microphone and the audio signal captured by the microphone is then processed to detect watermark information.

While such an approach may be suitable for some applications, it has considerable disadvantages in that an acoustic signal needs to be generated and monitored. Furthermore, background noise and/or other acoustic problems may interfere with the reliable capture of generated audio signals and/or the recovery of program identification information.

In view of the above, it should be appreciated that there is a need for methods and apparatus which facilitate the collection of viewership information in an automated manner without relying on the capture of acoustic information, e.g., audio signals output by a speaker, and the processing of signals generated from the recovered acoustic signals.

SUMMARY OF THE INVENTION

Methods and apparatus for monitoring program content being output to viewers and collecting viewership information are described.

In some embodiments a viewership monitoring application is loaded onto a secure device, e.g., such as a secure/trusted router, or a secure content playback device. The secure device then tracks viewership information relating to content which is supplied to the secure device, e.g., for communication to a playback device or for output in the case where the secure device is a playback device.

The secure device maybe, and in some embodiments is, a secure router or server though which content passes as it is delivered to a secure playback device. In such embodiments, the secure device which tracks viewership information effectively snoops the content which passes to the device and combines this with information about the number and/or ages of viewers to whom the content is being presented, e.g., displayed on a display device and/or output in the form of an acoustic audio signal.

The content for which viewership information is collected by the secure device is normally communicated through the communications network for delivery to a playback device in a secure, e.g., encrypted, form. Thus, in many cases the program content is communicated as encrypted digital program content. In various embodiments, an audio and/or video component of the program content is watermarked identifying the program, program source, content distributer supplying the content for playback, etc.

The information communicated by the watermarks included in the program content can not be easily detected by observing the encrypted program content since the encryption process is intended to secure the content making it hard to access and/or recover information from while in encrypted form.

In at least some embodiments, to facilitate recovery of program information from encrypted program content, the secure device is provided with decryption information, e.g., from a network security server and/or other device, allowing it to decrypt program content, intended for a playback device, which is supplied to the secure device. The secure device decrypts the encrypted program content and then processes the decrypted digital program content to recover program information, e.g., information identifying the program being viewed. In some embodiments, to recover the program information, the secure device decodes encoded audio and/or video data which is part of the decrypted digital program content and then processes the decoded audio and/or video data to recover information communicated by one or more watermarks included therein. While watermarks are often used to identify the program content, e.g., audio watermarks of the type used by some Nielsen viewership monitoring devices, metadata communicated with the digital program and/or other program identifying information can be, and in some embodiments is, recovered from the decrypted and decoded program content.

Recovered program identification information is combined with viewership information obtained from a user of a playback device that is used to output the program content to one or more viewers. In the present application the term viewer is to be interpreted broadly and can include listener information in the case where a program includes only audio content. The number, age and/or other information about viewers can, and in some embodiments is, received from a user, e.g., at the time a program is presented to a user and/or prior to presentation. In some embodiments a user may set a default setting indicating that a particular device normally has one or a particular set of users. In some embodiments, if a user does not supply viewership information corresponding to a specific program, e.g., a program being viewed, the default viewership information for the playback device for which viewership information is being generated is used, i.e., the default viewership information for a playback device outputting a program may be used and combined with information about the date and time the program was viewed.

In some embodiments the secure device which generates viewership information is a network router, server or other network device, e.g., a home network routing element located at a customer premise. In such cases, the viewership information may be entered by the user into a handheld playback device, set top playback device, or another type of secure playback device which supplies the viewership information to the router or other secure device generating the viewership information. Thus, the secure device tracking viewership information, through which program content is being supplied to the playback device, may receiver viewership information entered into a playback device by a user, e.g., viewer. In the case where the secure device is a playback device, the user may enter the information about the viewers viewing a program directly into the playback device.

In order to keep the encrypted program content from existing in an unsecure digital form, digital data which is decrypted by a secure device is not transmitted to a playback device except over a secure communications link or in a secure manner, e.g., in encrypted form.

In the case where the secure device is the playback device, the viewership monitoring module is implemented either as secure hardware, e.g., a secure circuit, or runs on a secure portion of the playback device which is allowed access to decrypted digital data. In the case where the viewership monitoring is performed in a home network device such a router, the encrypted program content is either forwarded in its original encrypted form to a secure playback device or the decrypted digital program content is re-encrypted prior to being delivered to the secure playback device. In the case where the encrypted program content is forwarded to the secure playback device, the secure playback device and router or other network element generating the viewership information share the security information, e.g., decryption key or shared secret, needed to decrypt the encrypted program content. In the case where the decrypted program content is re-encrypted for delivery to the secure playback device the router or other network device and the secure playback device have a security relationship with the router having an encryption key or shared secret with the secure playback device having a corresponding decryption key or shared secret. Thus, the communication of program content between the router and/or other network device can be secured but with potentially different encryption techniques and/or security information (different encryption/decryption keys) than is used to secure the delivery of the program content to the router or other network device.

While the router embodiment has the advantage of centralizing viewership monitoring in a home or other customer premise, the embodiments where the viewership monitoring is performed on the secure playback devices has the advantage that a network device need not be enabled to decode the encrypted program content being delivered to secure playback devices. Thus, while the router embodiment offers some centralization and hardware advantages over the embodiment where viewership is monitored at the playback device, the embodiment where the monitoring is performed at the playback device offers security advantages and reduces the need to share the information needed to decrypt the program content between multiple devices or support different encryption over the link to the router than between the router and secure playback device.

In many embodiments, the content delivery network is unaware of the viewership monitoring that is being performed. The viewership monitoring modules are loaded onto the secure devices by the end users of the devices, e.g., viewers who agree to participate in the monitoring process or program, and/or by the company implementing the monitoring program. Thus, the company implementing the monitoring program need not disclose or reveal which viewers are participating in the viewership monitoring process thereby helping to keep the identity of the viewers who are being monitoring and affecting program ratings secret from the public and/or content delivery companies, such as cable network service providers.

In accordance with some embodiments an exemplary method of collecting presentation information, comprises: receiving, at a secure device, encrypted program content including audio or video information identifying the program content; operating the secure device to decrypt the encrypted program to produce decrypted digital program content; operating the secure device to process the decrypted digital program content to recover the information identifying the program content; and generating viewership statistics from the recovered information identifying the program content. In some embodiments the viewership statistics is generated further based on viewership information provided by a viewer corresponding to the secure playback device to which the content is supplied for presentation. In some embodiments the generated viewership statistics is communicated to an external viewership information server.

Numerous additional features, embodiments and benefits are described in the detailed description which follows.

Various additional features and advantages of the present invention are discussed in the detailed description which follows.

DETAILED DESCRIPTION

Figure 1:
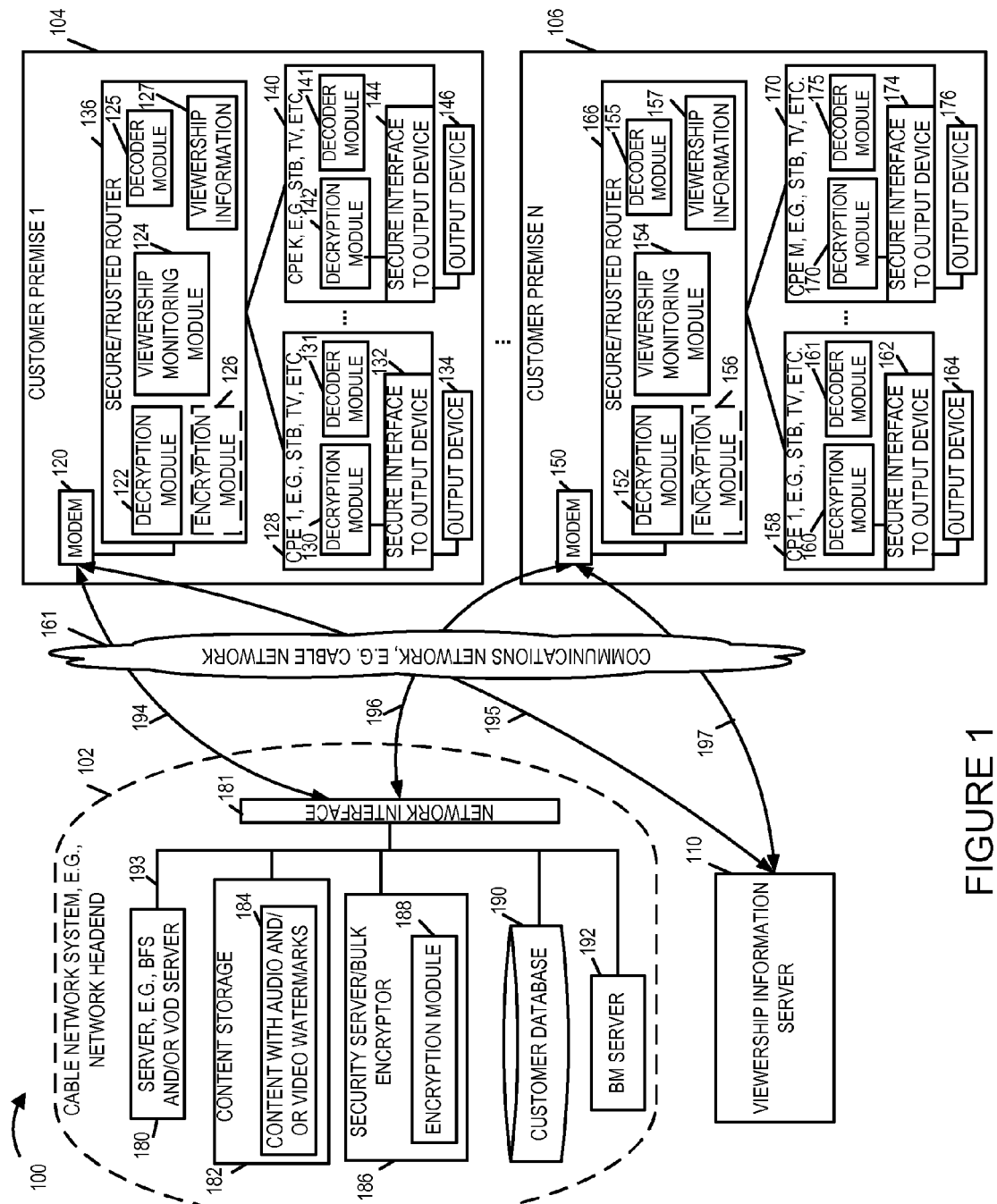
FIG. 1 illustrates an exemplary system implemented in accordance with the some embodiments of the present invention.

FIG. 1 illustrates an exemplary system 100 implemented in accordance with one exemplary embodiment of the present invention. The system 100 supports secure delivery of content to customer premise equipment (CPE), e.g., set top box, internet capable TVs, mobile phones etc., and monitoring of content viewership in accordance with some embodiments of the invention. The system 100 includes a network headend 102, a cable network 161, e.g., a hybrid fiber-coaxial (HFC) network and/or internet, a plurality of customer premises 104, 106 and a viewership information server 110. In various embodiments the content, e.g., multimedia content, is delivered from the headend 102 in encrypted form to a plurality customer premises including customer premise 104, 106. As will discussed, in accordance with one aspect of some embodiments, a secure CPE at the customer premises decrypt and process the received content to recover information identifying the program content, and generates viewership statistics from the recovered information.

The network headend 102 may be implemented at a cable network office or site including multiple servers and databases which are coupled together as shown. In the FIG. 1 example, the headend 102 includes a content server, e.g., a broadcast file server (BFS) and/or a video on-demand (VOD) server 180, content storage 182, a security server/bulk encryptor 186, a customer database 190, and a business management server 192. It should be appreciated that various servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 193. The local network 193 is coupled via one or more network interfaces 181 to other networks and/or devices. For example, the headend 102 is coupled via network interface 181 to communications network 161, e.g., a cable network, and may also be coupled to one or more other external networks. System 100 may also include one or more mobile network(s) including one or more base stations (BS) for supporting communications, e.g., delivery of content and/or other signaling, with mobile devices such as cell phones.

Via the cable network 161, the elements shown in the network headend 102 can send and/or exchange various information with the devices located at the customer premises 104, 106. The devices located at the customer premises 104, 106 are coupled to the cable network 161 via the modems 120, 150 as shown. In FIG. 1 embodiments, each customer premise 104, 106 respectively includes a modem device 120, 150, a secure/trusted router 136, 166, and one or more CPEs 128, 140, 158, 170, and an output device 134, 1146, 164, 176 coupled to each of the respective CPEs. In various embodiments the CPEs 128, 140, 158, 170 could be, e.g., set top box, internet capable TVs, personal computers, laptops, smart phones etc. In various embodiments the CPEs 128, 140, 158, 170 perform, among other things, the function of a content playback device to present the program content to a viewer, e.g., a customer/subscriber. The output device could be, e.g., standard television. It should be appreciated that each of the CPEs 128, 140, 158, 170 can be integrated in a device which also includes a display.

The CPEs, e.g., STBs, support video, audio and optionally, E-mail functionality. In some, but not all, embodiments the CPEs are IP capable set top box devices, e.g., STBs which support IP (internet protocol) and communications over the internet. The CPEs shown in the system 100 can be used to send information to the network headend 102 in addition to receiving programming content and/or information from the headend 102. Each customer premise 104, 106 may include additional customer premise devices, e.g., internet capable TVs, computers, mobile devices etc. The modems 120, 150 in some embodiments are e.g., cable modems.

As shown in FIG. 1, communications link 194 traversing the cable network 161 couples the modem 120 to the various elements/servers shown in the network headend 102. Similarly, modem 150 in the customer premise N 106 is coupled to the various elements/servers shown in the network headend 102 via link 196 which traverses the cable network 161. Communications links 195, 197 traversing the cable network 161 couple the modems 120, 150 to the viewership information server 110. In accordance with one feature, the CPEs and/or the routers 136, 166 can communicate and exchange information with the viewership information server 110.

In some embodiments the CPEs support internet browsing functionality. Thus the users at customer premise 104, 106 can browse the web and receive programming content through the CPEs. Additionally, the CPEs may, and often do, include DVR functionality and the storage of user selected content, e.g., data and/or video, and audio content. Although not shown, customer premise 104, 106 may also include additional STBs and display devices The content server 180, e.g., a broadcast file server (BFS) and/or video on-demand (VOD) server, among other things, is responsible for delivering programming content and/or other information to one or more customer premise equipments (CPEs 128, 140, 158, 170), including video on-demand content ordered by one or more customers. In some embodiments BFS server and VOD servers are implemented as separate individual servers. The content server 180 accesses the content from the content storage 186 and generates a transport stream suitable for delivery to various CPEs via the communications network 161. The content storage 186 stores content, e.g., audio, video and/or other multimedia content. As illustrated, the content storage 186 includes stored watermarked content 188, e.g., content with audio and/or video watermarks. The content with audio and/or video watermarks 188 is generated by digitally inserting watermarks on audio and/or video content.

The security server/bulk encryptor 186 includes an encryption module 188 responsible for encrypting the content stream generated by the content server 180 prior to delivery to the CPEs. The generated encrypted content stream is delivered to the CPEs over the communications network 161.

The customer database 190 includes, for a plurality of customers, customer information, account information and information regarding the devices installed at customer premises. In some embodiments customer account information includes, e.g., customer account number, customer subscription/service information, customer device capability and other billing related information. Customer database 190 also includes customer device information, e.g., identification and/or other information regarding customer devices such as secure routers, STBs, cable modems etc., installed at various customer premises served by the headend 102.

BM (Business management) server 192 processes billing information corresponding to customers serviced by the headend 102. This may include updating billing charge information in response to changes in services being provided to the customer, upgrades, on-demand content purchases, and/or other activity. Business management server 190 also processes services bill payment information, e.g., bill payment transactions, deductions from debit accounts, mail bills, and/or processes discount and/or other information.

Referring now to the customer premises 104, 106. Each customer premise includes a secure/trusted router 136, 166 respectively. Each of the routers 136, 166 respectively includes a decryption module 122, 152, a decoding module 125, 143, an optional encryption module 126, 156, a viewership monitoring module 124, 154, and generated viewership information 127, 157. In some embodiments the secure routers 136, 166 are configured to first decrypt the received digital program content, and then re-encrypt the decrypted digital content prior to outputting the digital content to the CPEs. In other embodiments the router also decodes the content prior to re-encrypting and sending it to the CPEs. In some embodiments the viewership monitoring module processes the decoded content, e.g., decompressed audio and/or video content. The decryption modules 122, 152 are configured to decrypt the received encrypted program content stream from the headend 102 using a first decryption key to recover digital program content. In some embodiments the optional encryption modules 126, 156 are provided and are configured to re-encrypt the decrypted digital program content before supplying the digital program content to the corresponding CPEs from the secure routers 136, 166. In such embodiments the CPEs 124, 140 and 158, 170 then decrypt the digital content supplied by the secure routers 136, 166 using a second decryption key provided by the corresponding secure routers 136, 166.

In some other embodiments, the secure routers 136, 166 are configured to output the received encrypted digital content to the CPEs in encrypted form as received from the headend 102. In such embodiments the CPEs receiving the encrypted digital content perform decryption using a decryption key provided by the headend 102 to recover the program content. The CPEs 128, 140 and 158, 170 perform the function of playback devices to present the content to the subscriber/customer.

The viewership monitoring modules 124, 154 monitor and collect viewership information, e.g., what content users are watching, when they are watching, how many individual are watching etc. In various embodiments the viewership monitoring modules 124, 154 are configured to process the decrypted program content from the corresponding decryption modules 122, 152 to recover information identifying the program content, e.g., by processing the decrypted content to identify the watermarks included in the received encrypted program content. Thus in some embodiments the viewership monitoring modules 124, 154 identify the program content and track what program content is being supplied to the CPEs from the routers 136, 166 to generate the viewership statistics. In some embodiments the viewership monitoring modules 124, 154 is configured to receive information indicating a number of viewers to which the decrypted program content is being output.

The viewership information 127, 157 are outputs of the respective viewership monitoring modules 124, 154. The generated viewership information 127, 157 includes the viewership statistics collected by the viewership monitoring modules 124, 154 and is sent, e.g., periodically, for example, every 24 hours, to the viewership information server 110 which uses the collected viewership statistics for a variety of purposes and applications. The generated viewership information 127, 157 includes viewership statistics corresponding to a plurality of programming content, e.g., shows, movies, songs, etc. In some embodiments the viewership information 127, 157 is generated by the viewership monitoring modules 124, 154 based on the knowledge of the identified decrypted program content being output to the CPEs and the received information indicating a number of viewers to which the decrypted program content is being output.

Each of the CPEs 128, 140, 158, 170 respectively includes a decryption module 160, 142, 160, 172, a decoding module 131, 141, 161, 175 for decoding decrypted audio and/or video and a secure interface to an output device 132, 144, 162, 174. While the secure interface may output content in a secure, e.g., encrypted form, in accordance with the DLNA standard, it is to be understood that the encrypted content is normally not encoded, e.g., is not compressed thereby allowing a receiving device to easily use the content without having to perform a decoding operation thereon. Each CPE is coupled to an output device 134, 146, 164, 176 via the corresponding secure interface as shown in the Figure. In some embodiments the secure interface is e.g., an HDMI (high definition multimedia interface) interface or another secure interface. The output devices 134, 146, 164, 176 could be standard TVs, internet capable TVs, monitors, laptops, etc. Each of the decryption module 160, 142, 160, 172 is configured to decrypt the received digital program content from the secure routers 136, 166, and provide the decrypted digital content to the corresponding output device 134, 146, 164 for presentation to the customers, via the corresponding secure interface 132, 144, 162, 174.

Viewership information server 110 gathers/collects viewership information from one or more secure devices at the customer premises 104, 106. In some embodiment, the viewership information server 110 is included in the network headend 102. Monitoring and tracking of viewership statistics corresponding to cable service subscribers, e.g., viewing information such as programming content being viewed, number of individuals/subscriber household that watch a particular programming content, can be desirable for a variety of purposes and use.

Figure 2:
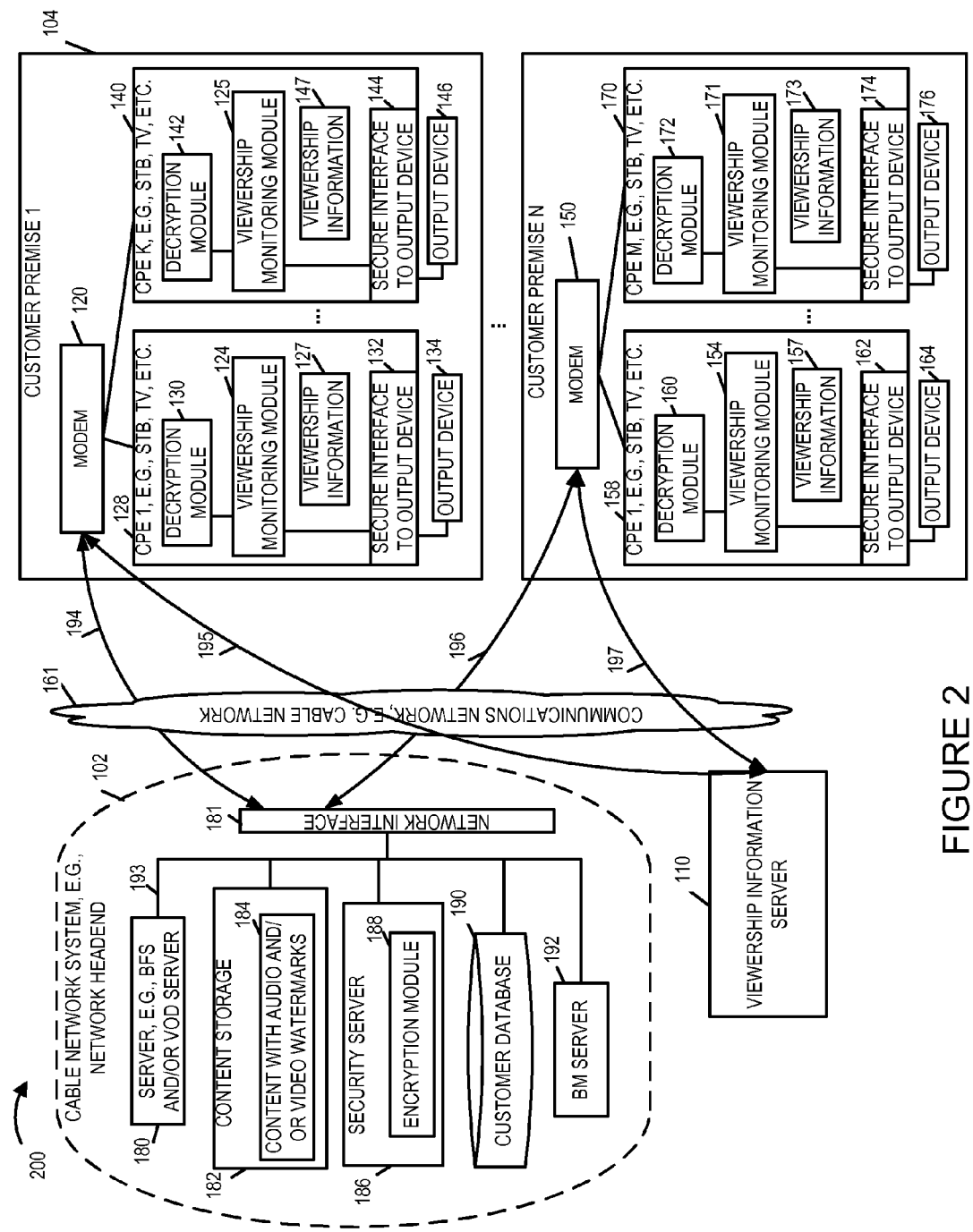
FIG. 2 illustrates an exemplary system implemented in accordance with another exemplary embodiment of the present invention.

FIG. 2 illustrates another exemplary system 200 implemented in accordance with another exemplary embodiment. Various servers, devices and/or modules shown in the FIG. 2 embodiment that bear the same reference number as used to illustrate the various elements of system 100, are the same or similar in function to the elements of system 100 discussed above. Accordingly, to avoid repetition, these elements will not be discussed again. One difference in the FIG. 2 embodiment that can be appreciated from the figure is that in this embodiment a secure/trusted router is not implemented at the customer premises 104, 106. Unlike the embodiment of FIG. 1, in FIG. 2 embodiment the decryption key is not shared by two devices (the secure routers and the CPEs) at the customer premise 104, 106. Rather only the CPEs 128, 140, 158, 170 are provided with the decryption key by the headend 102 to decrypt and recover the digital program content.

Thus system 200 of FIG. 2 illustrates an embodiment where the encrypted digital content is received by the CPEs at the customer premises 104, 106 and the viewership monitoring function is implemented by the additional modules included in the secure CPEs devices 128, 140, 158, 170 as shown. While in the FIG. 2 embodiments decoders 131, 143, 165, 175 are not shown, it is to be understood that they are included in the CPE devices and operate to decode decrypted content as previously discussed with regard to the FIG. 1 embodiment.

In the FIG. 2 embodiment, the CPEs 128, 140, are coupled to the modem 120 while CPEs 158, 170 are coupled to modem 150. In addition to the decryption module and a secure interface discussed with regard to FIG. 1 embodiment, in the FIG. 2 embodiment each of the CPEs 128, 140, 158, 170 further includes a viewership monitoring module 124, 125, 154, 171 and generated viewership information 127, 147, 157, 173 which is generated by the corresponding viewership monitoring module in the corresponding CPE as shown. As discussed above with regard to the viewership monitoring modules of system 100, the viewership monitoring modules 124, 125, 159, 171 monitor and collect viewership information. However in FIG. 2 embodiment, the viewership monitoring function is performed in the secure CPEs where the viewership monitoring modules 124, 125, 159, 171 is implemented. The function of various other elements is the same as discussed in the FIG. 1 example.

Figure 3:
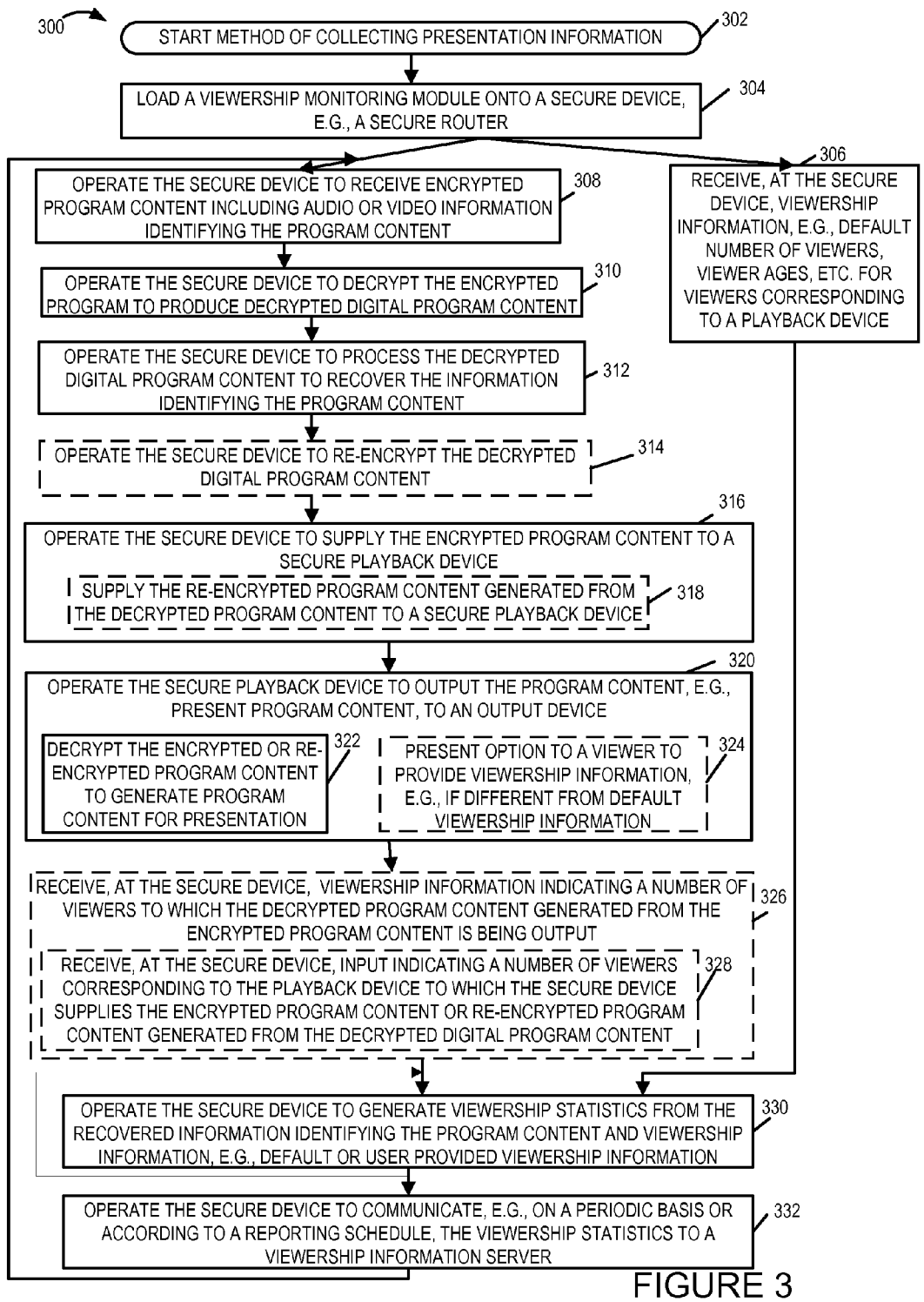
FIG. 3 is a flowchart illustrating the steps of an exemplary method performed in accordance with some embodiments of the invention.

FIG. 3 illustrates a flowchart 300 showing the steps of an exemplary method of collecting viewership information, in accordance with some embodiments of the invention.

The method 300 includes steps performed by various elements of an exemplary system, e.g., exemplary system 100 shown in FIG. 1. In some embodiment some of the steps are performed by a secure device, e.g., a secure/trusted router such as secure routers 136, 166 while various other steps are performed by various elements shown in the system 100 including a secure playback device, e.g., a customer premise equipment such as CPE 128, 158 etc. For the purpose of discussion of flowchart 300, consider that the secure device is the secure router 136 and the secure playback device is a CPE such as CPE 128.

The method 300 starts in step 302, e.g., with the secure device and various components in the system being initialized.

Operation proceeds from step 302 to step 304. In step 304 a viewership monitoring module, e.g., such as viewership monitoring module 124, is loaded onto the secure device. The functionality of viewership monitoring module is discussed above with regard to FIGS. 1-2. The viewership monitoring module in some embodiments is implemented as an application and is loaded onto the secure device, e.g., by the user of the secure device or by a third party after getting user's/customer's input, e.g., approval, for loading the viewership monitoring module. Thus in some embodiments, step 304 of loading the monitoring module is performed in response to a user input.

Operation proceeds from step 304 to steps 306 and 308. In some embodiments, steps 306 and 308 are performed asynchronously and independently. In step 306 the secure device gets viewership information from the playback device, e.g., CPE, with which the secure device communicates based on the default settings set by the user on the playback device. The viewership information may include, e.g., default number of viewers, corresponding viewer ages etc., for the viewers corresponding to the playback device(s) that receive program content through the secure router. The default viewership information in some embodiments is communicated by the playback device(s) coupled (in a wired manner or wirelessly) to the secure router, e.g., in response to a request from the secure router for viewership information. As there may be one or more playback devices that provide the viewership information to the secure router, in some embodiments the secure router is configured to maintain a separate record of viewership information corresponding to the different playback devices. The secure router device keeps track of the default viewership Operation proceeds from step 306 to step 330.

Returning to step 308. In step 308 the secure device is operated to receive encrypted program content including audio or video information identifying the program content, e.g., encrypted content with audio and/or video watermarks. Operation proceeds from step 308 to step 310. In step 310 the secure device is operated to decrypt the received encrypted program content to produce decrypted digital program content.

Operation proceeds from step 310 to step 312. In step 312 the secure device processes the decrypted program content to recover the information identifying the program content received in the encrypted program stream. In various embodiments the secure device performs a decoding operation on the decrypted program content as part of the processing. Operation proceeds from step 312 to optional step 314 (shown in dashed box) which is performed in some embodiments while not in others.

In step 314, the secure device re-encrypts the decrypted digital program content. The re-encryption in various embodiments is performed by the secure device using a different encryption key/mechanism than the one used by the bulk encryptor 186 for encrypting the program content which is received by the secure device in encrypted form in step 308. Thus the re-encryption is performed by the router using different security information (e.g., a different encryption key) than encryption used to generate the received encrypted program content. In various embodiments the secure device uses a security information (e.g., encryption key) known to the secure playback device, e.g., CPE. Operation proceeds from optional step 314 to step 316.

In embodiments where the optional step 314 is skipped, the operation proceeds from step 312 to step 316. In step 316 the secure device is operated to supply the digital program content in encrypted form to the secure playback device, e.g., CPE, which may be a set top box, a cell phone (smart phone), a tablet computer device etc. In some embodiments the secure device supplies the original received encrypted digital program content to the secure playback device as shown in step 316. In some other embodiments where step 314 is performed, step 316 includes performing optional step 318 wherein the secure device supplies the re-encrypted program content generated from the decrypted program content to the secure playback device.

Operation proceeds from step 316 to step 320. In step 320 the secure playback device is operated to output the program content, e.g., present the program content, to an output device, e.g., output device 134. In some embodiments the output device may be a display device, e.g., a TV or another device where content can be presented. In some embodiments the output device is integral to the secure playback device or coupled to the secure playback device via a secure communications interface, e.g., an HDMI interface. As part of performing step 320, in various embodiments step 322 is performed where the secure playback device decrypts the received encrypted program content or the re-encrypted program content to generate program content for presentation to one or more viewers corresponding to the playback device. Thus in step 320 the secure playback device decrypts the program content received in encrypted form from the secure router and presents the program content to the one or more viewers, e.g., on a display device. In some embodiments, step 324 is also performed as part of step 320. In step 324 the secure playback device presents an option, e.g., as a prompt on the display device, to a viewer to provide viewership information, e.g., if different from the default viewership information. Thus in step 324 an option is provided to the viewer to enter/input viewership information, e.g., number of viewers watching the program content, their corresponding age and/or other information. The user provided viewership information may, and in some embodiments is, communicated from the playback device to the secure router device.

Operation proceeds from step 320 to step 326 which is optional and is performed in some but not all embodiments. In step 326 the secure device receives viewership information indicating a number of viewers to which the decrypted program content is being output, e.g., number of viewers to which the program content is presented. In some embodiments, step 326 includes step 328 where the secure router device receives input indicating a number of viewers corresponding to the playback device to which the secure router supplies the encrypted program content or the re-encrypted program content generated from the decrypted program content. In some embodiments the received input in step 328 is received in response to the prompt presented by the playback device to the user to enter viewership information. The secure playback device receives the user input indicating viewership information and communicates it to the secure router. In some embodiments if the viewership information is not different from the default viewership information provided by the user earlier, the user may simply close the prompt window and not enter new viewership information. In accordance with one aspect, in such embodiments steps 326 and 328 are skipped and the secure router device uses the default viewership information to generate viewership statistics.

Operation proceeds from step 326 to step 330. In step 330 the secure device generates viewership statistics from the recovered information identifying the program content (step 312) and viewership information, e.g., using default viewership information (step 306) or user provided viewership information (step 326). In various embodiments the viewership statistics is generated on an ongoing basis as represented in the flowchart 300 by the loopback in step 330. Thus in the above described manner the secure device generates viewership statistics indicating, for example, what program content was being viewed, how many viewers watched the program content, corresponding ages of the viewers, etc. The viewership monitoring module loaded on the secure devices also monitors time duration for which some identified program content was output to the playback device and thus determines for how much time the program content was viewed by the viewers. This may be done in a variety of ways, but effectively the secure router device is able to detect for how long the identified program content was output to the viewers via the playback device. In various embodiments the viewership statistics also includes information indicating a time duration for which an identified program content was viewed.

Operation proceeds from step 330 to step 332. In step 332 the secure device is operated to communicate the generated viewership statistics to a viewership information server, e.g., server 110. Operation proceeds from step 332 back to step 308 and the process continues.

Figure 4:
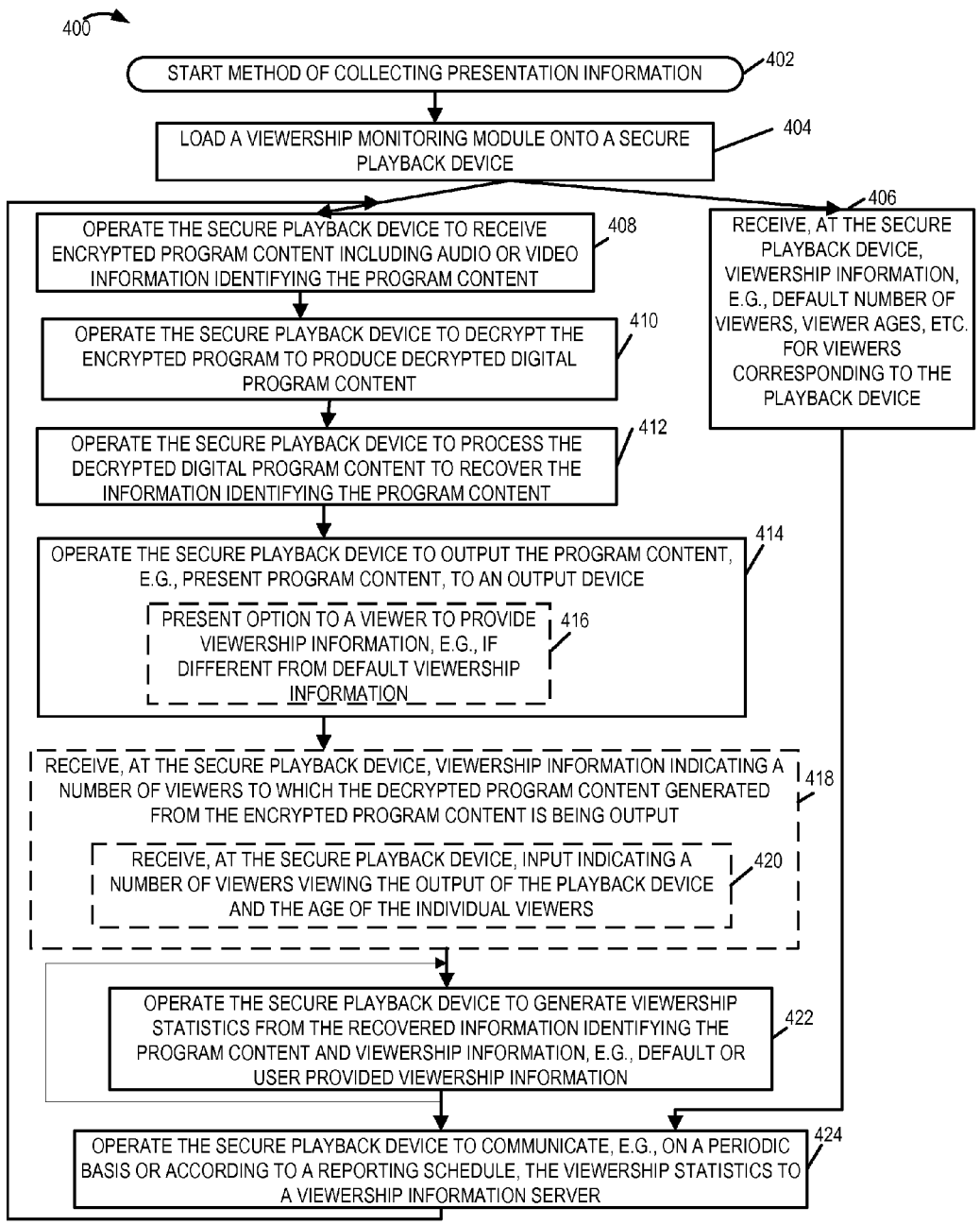
FIG. 4 is a flowchart illustrating the steps of an exemplary method performed in accordance with some other embodiments of the invention.

FIG. 4 illustrates a flowchart 400 showing the steps of an exemplary method of operating a secure device, e.g., a secure playback device, for collecting viewership information, in accordance with some embodiments of the invention.

The method 400 includes steps performed by the secure play back device, e.g., a customer premise equipment such as CPE 128, 140, 158, 170 shown in the exemplary system 200 of FIG. 2. In some embodiments the secure playback device implementing the method of flowchart 400 is a portable playback device including one of a cell phone or a tablet device. In some embodiments the secure playback device is one of a set top box (STB), an internet capable TV, or a computer, e.g., PC, or laptop device. Various steps in the flowchart 400 are similar to the steps of flowchart 300 discussed above, however it should be appreciated that the steps of flowchart 400 are implemented by a secure playback device and not a secure router.

The method 400 starts in step 402, e.g., with the secure playback device being initialized. Operation proceeds from step 402 to step 404. In step 404 a viewership monitoring module, e.g., such as viewership monitoring module 124, is loaded onto the secure playback device. The viewership monitoring module in some embodiments is implemented as an application and is loaded onto the secure playback device, e.g., by the user of the secure playback device or by a third party after getting user's/customer's approval for loading the viewership monitoring module. Thus in some embodiments, step 404 of loading the monitoring module is performed in response to a user input.

Operation proceeds from step 404 to steps 406 and 408 which may be performed asynchronously and independently. In step 406 the secure playback device receives viewership information, e.g., viewership information entered by the user of the playback device as default settings on the playback device. The viewership information may include, e.g., default number of viewers, corresponding viewer ages etc., for the viewers corresponding to the playback device that receive program content through the secure router. The default viewership information in some embodiments is communicated by the playback device to the secure router, e.g., in response to a request from the secure router for viewership information. Operation proceeds from step 406 to step 430.

Returning to step 408. In step 408 the secure playback device receives encrypted program content including audio or video information identifying the program content, e.g., encrypted content with audio and/or video watermarks. Operation proceeds from step 408 to step 410. In step 410 the secure playback device is operated to decrypt the received encrypted program content to produce decrypted digital program content.

Operation proceeds from step 410 to step 412. In step 412 the secure playback device processes the decrypted program content to recover the information identifying the program content received in the encrypted program stream. Operation proceeds from step 412 to step 414. In step 420 the secure playback device is operated to output the decrypted program content, e.g., present the program content, to an output device, e.g., output device 134. In some embodiments the output device may be a display device, e.g., a TV or another device where content can be presented. In some embodiments the output device is integral to the secure playback device or coupled to the secure playback device via a secure communications interface, e.g., an HDMI interface.

As part of performing step 414, in various embodiments step 416 is performed where the secure playback device presents an option, e.g., as a prompt on the output device, to a viewer prompting the viewer to provide viewership information, e.g., if different from the default viewership information. Thus in step 416 an option is provided to the viewer to enter/input viewership information, e.g., number of viewers watching the program content, their corresponding age and/or other information. In some embodiments the user of the playback device responds to the prompt by entering viewership information.

Operation proceeds from step 414 to step 418 which is optional and is performed in some but not all embodiments. In step 418 the secure playback device receives viewership information indicating a number of viewers to which the decrypted program content is being output, e.g., number of viewers to which the program content is presented. In some embodiments, step 418 includes step 420 where the secure playback device receives input indicating a number of viewers viewing the output of the playback device and the respective age of the individual viewers. In some embodiments step 418 is performed in response to receiving the user's response to the prompt presented to the user to provide viewership information in step 416. Operation proceeds from step 418 to step 422.

If the viewership information is not different from the default viewership information provided by the user earlier, the user may simply close the prompt window and not enter new viewership information. In accordance with one aspect, in such embodiments steps 418 and 420 are skipped and the secure playback device uses the default viewership information to generate viewership statistics. In such embodiment the operation proceeds from step 414 to step 422.

In step 422 the secure playback device generates viewership statistics from the recovered information identifying the program content (step 412) and viewership information, e.g., using default viewership information (step 406) or user provided viewership information (step 418). It should be appreciated that the various embodiments the viewership statistics is generated on an ongoing basis as represented in the flowchart 400 by the loopback in step 422. Thus in the above described manner the secure device generates viewership statistics indicating, for example, what program content was being viewed, number of viewers watching the identified program content, corresponding ages of the viewers, for how much time the identified program content was viewed by the viewers etc.

Operation proceeds from step 422 to step 424. In step 424 the secure playback device is operated to communicate the generated viewership statistics to a viewership information server, e.g., server 110. Operation proceeds from step 424 back to step 408 and the process continues.

Figure 5:
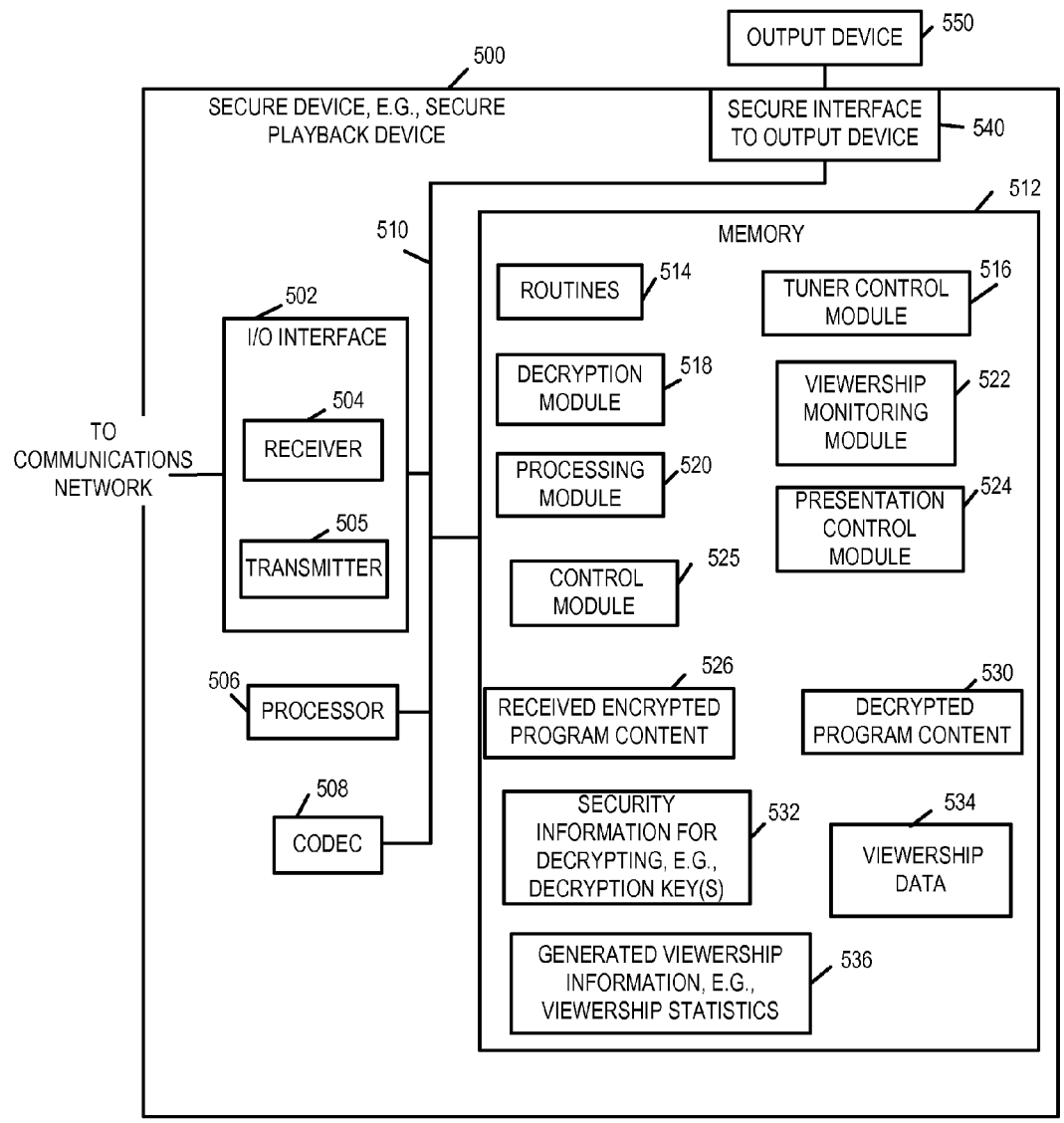
FIG. 5 illustrates an exemplary secure device implemented as a secure playback device in accordance with some exemplary embodiments.

FIG. 5 illustrates an exemplary secure device 500 implemented as a secure playback device, e.g., such as the CPE devices 128, 158 etc. shown in FIG. 2. In some embodiments the secure playback device 500 implements the method of flowchart 400. Some of the modules shown in FIG. 6 example are optional.

As shown, the secure device 500 is coupled, via a secure interface 540, to an output device 550, e.g., a television (TV), a display device, or another device for presenting program content. In some embodiments the output device 550 is integral to the secure playback device 500 or coupled as shown via the secure communications interface 540, e.g., an HDMI interface.

As shown, the secure device 500 includes an Input/Output (I/O) interface 502, a processor 506, a codec (Coder/Decoder) 508, and a storage device, e.g. a memory 512 coupled together via a bus 510. The various elements of the secure device 500 can exchange data and information over the bus 510. Via the I/O interface 502, the secure device 500 can exchange signals and/or information with other devices and/or system elements such as the modem and/or servers in the network headend 102, via the communications network 161. The I/O interface 502 includes a receiver 504 and a transmitter 505 that support the receipt and/or transmission of content, and/or other information from/to different servers. In some embodiments the I/O interface 502 also includes, e.g., an infrared signal receiver to receive signals from a user remote control device. In some embodiments the I/O interface 502 includes an in-built modem which supports receiving content.

The processor 506, e.g., a CPU, executes routines 514 and one or more modules and controls the secure device 500 to operate in accordance with the invention. To control the secure device 500, the processor 506 uses information, various modules and/or routines including instructions stored in memory 512. The Codec 508 is implemented as a module and is capable of performing encoding and/or decoding operations on a digital data stream or signal.

In addition to the routines, the memory 512 in some embodiments includes a tuner control module 516, a decryption module 518, a processing module 520, a viewership monitoring module 522, a presentation control module 524, received encrypted program content 526, decrypted program content 530, security information 532, e.g., decryption key(s), received viewership data 534, and generated viewership statistics 536.

Routines 514 include communications routines and/or secure device control routines. The tuner control module 516 controls the playback device receiver to tune to a frequency corresponding to a program channel to be viewed. The decryption module 518 is configured to decrypt the received encrypted program content 526 to produce decrypted digital program content 530. The received encrypted program content 526 may be the encrypted program content from the headend 102 or the re-encrypted program content generated by a secure router, e.g., router 136. The decryption module 518 uses the security information, e.g., a decryption key, provided by the headend 102 and/or the secure router, to decrypt the encrypted program content 526.

The processing module 520 is configured to process the decrypted digital program content 530 to recover the information identifying the program content. The output of the processing module 520 is provided to the viewership monitoring module 522 in various embodiments. The control module 525 controls loading of the viewership monitoring module 522 onto said secure playback device 500 in response to a user input.

The viewership monitoring module 522 is configured to generate viewership statistics from the recovered information identifying the program content. In various embodiments the viewership monitoring module 522 is further configured to use viewership data 534, e.g., user provided viewership information, in addition to the information identifying the program content to generate viewership statistics 536. User input signals, e.g., communicating user entered viewership information and/or other instruction, from a remote control may be received via I/O module 502 which may include, in addition to a cable network interface, an IR or radio interface for receiving signals from a remote control device.

The presentation control module 524 controls presentation of program content, prompts, specific messages, etc., on the user display device screen in accordance with the invention.

In some embodiments one or more of the above discussed modules work under the control of the processor 506. In some embodiments, one or more of the various modules discussed above work in coordination, e.g., with operations being merged to perform a function, to produce a desired output in accordance with the exemplary methods of the invention.

Figure 6:
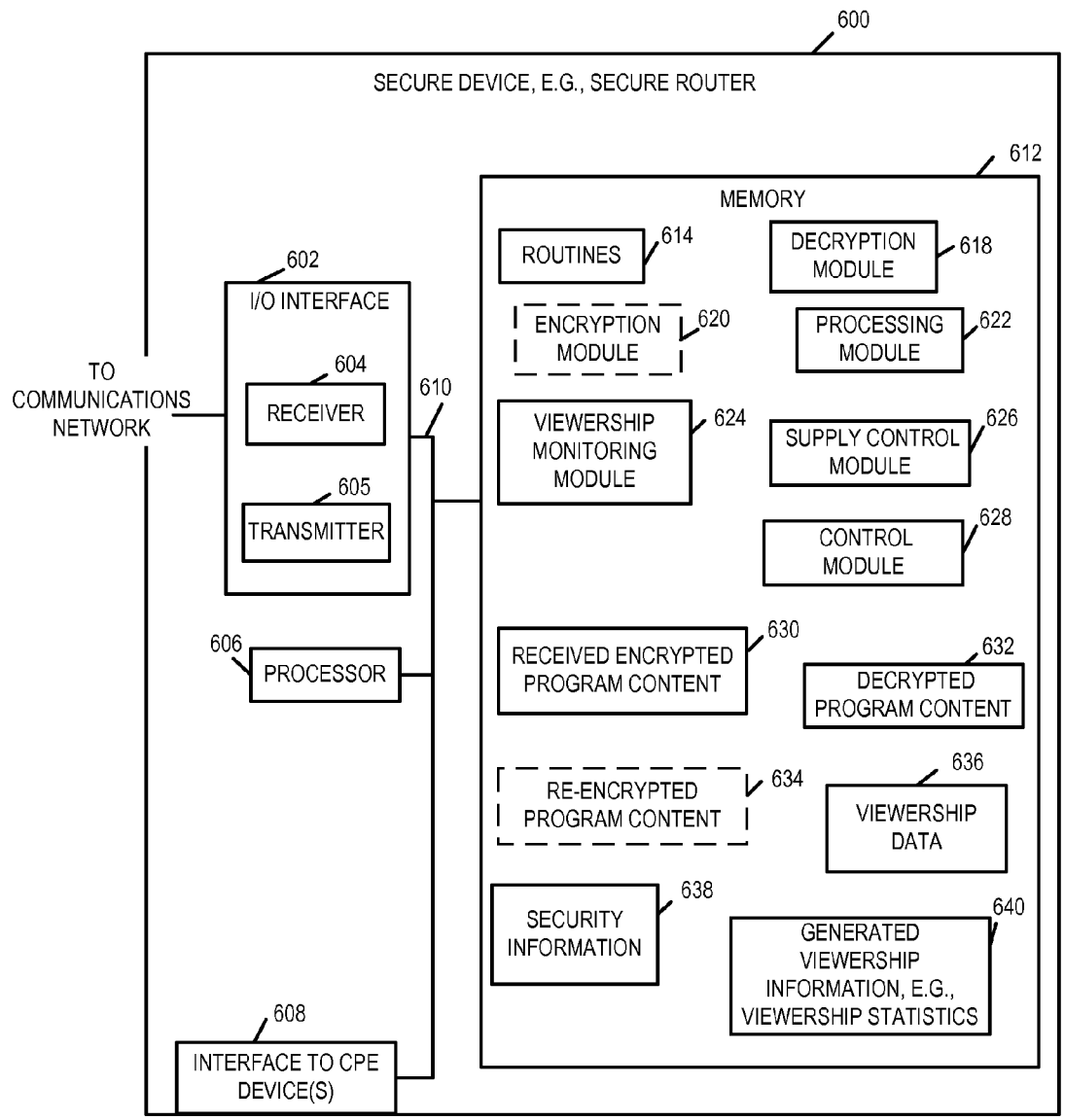
FIG. 6 illustrates an exemplary secure device implemented as a secure router in accordance with some exemplary embodiments.

FIG. 6 illustrates an exemplary secure device 600 implemented as a secure router, e.g., such as any one of the secure routers shown in FIG. 1, in accordance with some embodiments. In some embodiments the secure router device 600 is used to implement one or more steps of the method of flowchart 300.

As shown, the secure device 500 is coupled, via a secure interface 540, to an output device 550, e.g., a television (TV), a display device, or another device for presenting program content. In some embodiments the output device 550 is integral to the secure playback device 500 or coupled as shown via the secure communications interface 540, e.g., an HDMI interface.

As shown, the secure router 600 includes an Input/Output (I/O) interface 602, a processor 606, an interface 608 to customer premise device(s), and a storage device, e.g. a memory 612 coupled together via a bus 610. The various elements of the secure device 600 can exchange data and information over the bus 610. Via the I/O interface 602, the secure router 600 can exchange signals and/or information with other devices and/or system elements such as the modem and/or servers in the network headend 102 via the communications network 161. The I/O interface 602 includes a receiver 604 and a transmitter 605 that support the receipt and/or transmission of content, and/or other information from/to different servers.

The processor 606, e.g., a CPU, executes routines 614 and one or more modules and controls the secure router 600 to operate in accordance with the invention. To control the secure router 600, the processor 606 uses information, various modules and/or routines including instructions stored in memory 612.

In addition to the routines, the memory 612 in some embodiments includes a decryption module 618, an optional encryption module 620, a processing module 622, a viewership monitoring module 624, a supply control module 626, received encrypted program content 630, decrypted digital program content 632, re-encrypted program content 634, received viewership data 636, security information 638, e.g., encryption and decryption key(s), and generated viewership statistics 640.

Routines 614 include communications routines and/or secure device control routines. The decryption module 618 is configured to decrypt the received encrypted program content 630 to produce decrypted digital program content 632. The decryption module 618 uses the security information, e.g., a decryption key, provided by, e.g., the headend 102, to decrypt the encrypted program content 630. The optional encryption module 620 is included in some embodiments and is used to re-encrypt the decrypted digital program content 632 to produce re-encrypted program content 634. The encryption module 620 uses security information 638, e.g., encryption/decryption keys, known to the secure playback device to which the secure router 600 supplies the encrypted program content. The encryption module 620 is configured to use different security information for re-encryption than used to generate said received encrypted program content 630.

The processing module 622 is configured to process the decrypted digital program content 632 to recover the information identifying the program content. In some embodiments a decoder module is also included in the memory 612 and is used for performing decoding operations on digital program content as part of the processing. The output of the processing module 622 is provided to the viewership monitoring module 624 in various embodiments. The control module 628 controls loading of the viewership monitoring module onto said secure router 600.

The viewership monitoring module 624 is configured to generate viewership statistics from the recovered information identifying the program content. In various embodiments the viewership monitoring module 624 is further configured to use viewership data 636, e.g., user provided viewership information, in addition to the information identifying the program content to generate viewership statistics 640. In some embodiments the viewership data 636 is provided to the secure router 600 by the playback device. The supply control module 626 is configured to supply, e.g., via the interface 608, the encrypted program content 630 or the re-encrypted program content 634 to a secure playback device, e.g., playback device 500.

In some embodiments one or more of the above discussed modules work under the control of the processor 606. In some embodiments, one or more of the various modules discussed above work in coordination, e.g., with operations being merged to perform a function, to produce a desired output in accordance with the exemplary methods of the invention.

Figure 7:
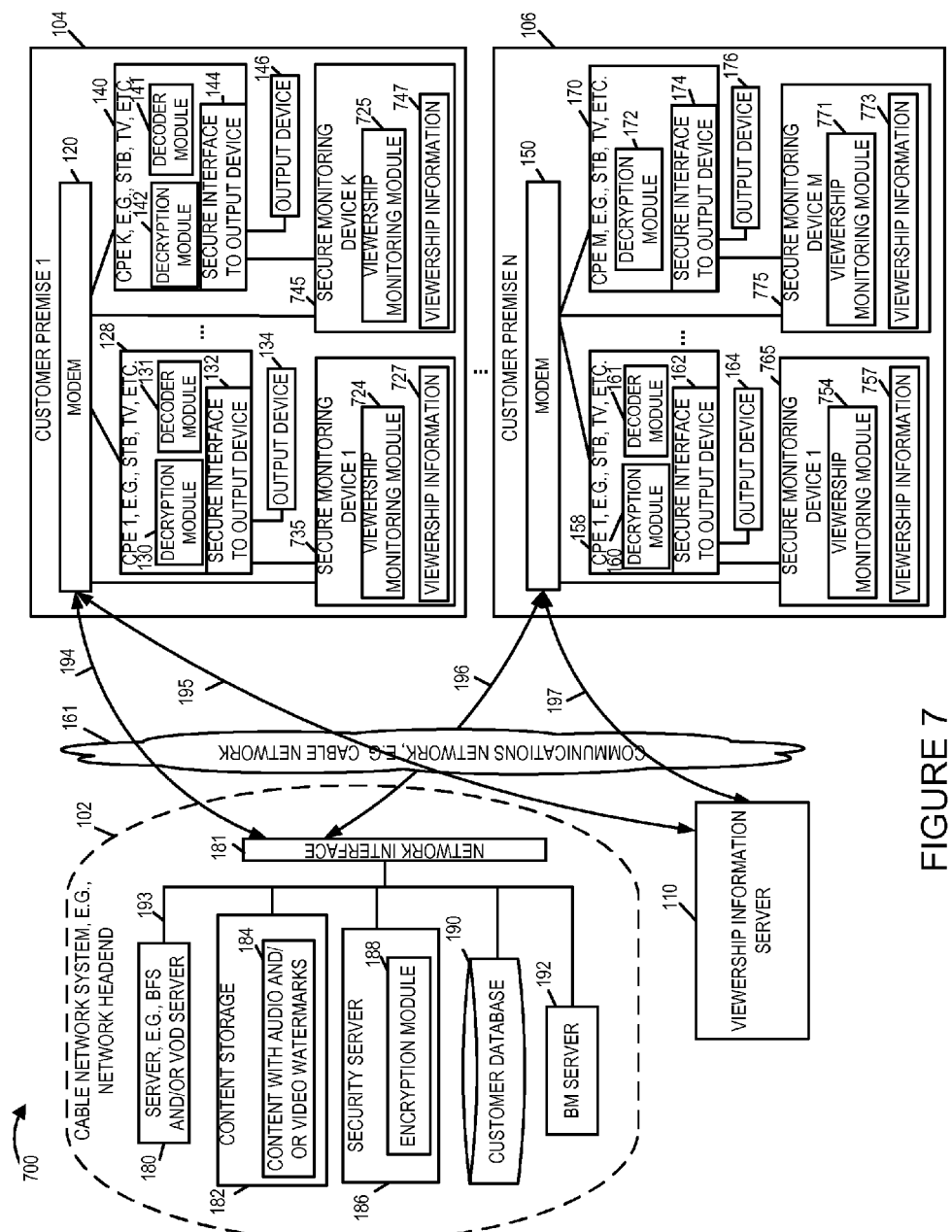
FIG. 7 illustrates yet another exemplary system implemented in accordance with another exemplary embodiment of the present invention.
Figure 8:
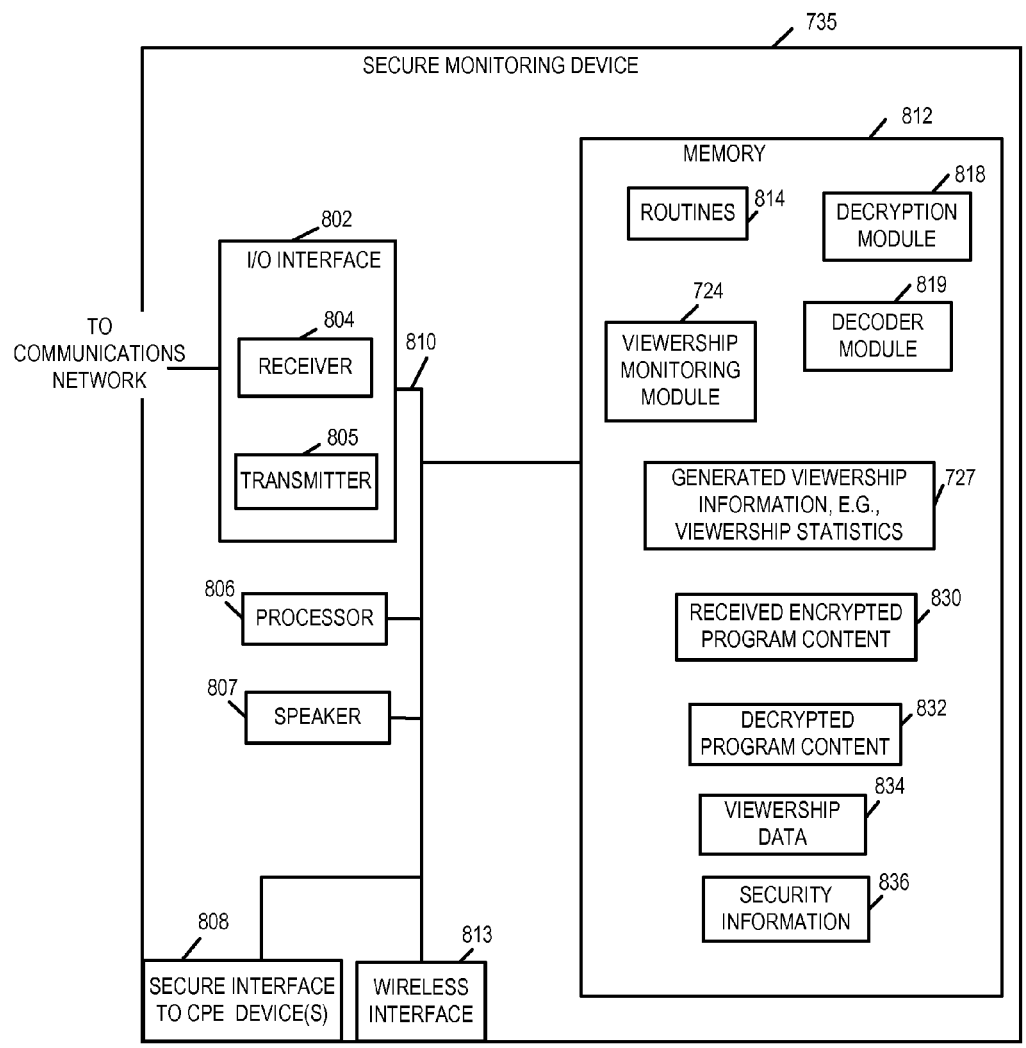
FIG. 8 illustrates an exemplary secure monitoring device implemented in accordance with an exemplary embodiment of the invention which can be used in the exemplary system shown in FIG. 7.

FIG. 7 illustrates another exemplary system 700 implemented in accordance with another exemplary embodiment. Various servers, devices and/or modules shown in the FIG. 7 embodiment that bear the same reference number as used to illustrate the various elements of systems 100 and 200, are the same or similar in function or hardware to the elements of system 100 and 200 discussed above. Accordingly, to avoid repetition, these elements will not be discussed again. One difference in the FIG. 7 embodiment that can be appreciated from FIG. 7 is that in this embodiment the viewership monitoring function is implemented by a secure monitoring device that is coupled to a CPE device such as CPE 128, 140, 158 and/or 170. For example secure monitoring device 735 is coupled to the secure interface of CPE 1 128, e.g., via a DLNA (Digital Living Network Alliance) compliant communication link. In at least one such embodiment the CPE device 128 as well as the secure monitoring device 1 735 are DLNA certified devices, e.g., secure devices which have passed one or more certification requirements with regard to the handling and treatment of content which is to be treated in a secure manner. An exemplary secure monitoring device 735 is illustrated in FIG. 8. The secure monitoring device 1 735 may, and in various embodiments does, interact with the CPE device 128, and receives audio secured using encryption, from the CPE device 128 in the same manner as a DLNA certified speakers. The audio, while encrypted, is normally decoded by the CPE 128, after decryption of received content, prior to re-encryption for transmission to the secure monitoring device 1 175. Thus, while the audio maybe encrypted it is normally not encoded, e.g., compressed, when it is communicated to the secure monitoring device 735. However, in some embodiments the CPE device does output the content in encypted and compressed (encoded) form. The CPE device 128 may and in some embodiment does include a decoder module 131, 141, 161 or 175 for decoding decrypted content prior to it being supplied to the secure interface which may re-encrypt the content. The secure monitoring device 1 735 is capable, and does, decrypt and/or decode the content it receives from the CPE device and processes it in various embodiments to detect information, e.g., watermarks and/or other information, indicating the content being played, e.g., viewed or listened to, by a user of the CPE device 128. The information about content being viewed is collected and communicated from the secure monitoring device 1 735, via a network connection, e.g., through the cable modem 120 or via a wireless connection to the viewership monitoring information server 110.

Output device 134, e.g., a DLNA certified display and/or speakers, are trusted along with the secure monitoring device 735 to handle video and/or other content in a secure manner with the link between CPE 1 128 and the secure monitoring device 735 being protected though the use of encryption in at least some embodiments.

Since the secure monitoring device 735 is treated like one of a variety of DLNA supported output devices no special hardware or other modification is needed to CPEs which support DLNA certified output devices to implement the viewership data monitoring since it is implemented by a separate device. In fact, in some embodiments the secure monitoring device 735 simply presents and identifies itself to the secure interface 132 as a speaker which supports DLNA functionality with the secure monitoring device 735 appearing to the interface as one of a plurality of DLNA certified speakers which are coupled to the CPE device 128. While the secure monitoring device 735 identifies itself as a supported speaker in some embodiments, it normally does not output audio signals from the audio information it receives from the CPE device 128 however, in some embodiments the secure monitoring device 735 does incorporate a speaker 807 shown in FIG. 8 in which case acoustic audio signals are output in addition to the monitoring information. The link to the modem 120 and/or back to the viewership information server 110 may be a wireless communications link, e.g., via the wireless interface 813. The wireless interface 813 may be coupled to an antenna for transmitting and receiving wireless signals. In fact, in some embodiments the secure viewership monitoring device 735 includes a cellular network transceiver allowing it to communicate generated viewership information 727 via a cellular telephone and/or data network to the viewership information server 110 without the need for a communications link via the modem 120.

Thus system 700 of FIG. 7 illustrates a system embodiment where the encrypted digital content is received by the CPEs at the customer premises 104, 106 and the viewership information monitoring is performed by external secure monitoring devices which receive the programming content from the CPEs through a secure interface, e.g., a DLNA interface.

As discussed with regard to FIG. 2 embodiment, the CPEs 128, 140, 158, 170 are provided with the decryption key by the headend 102 to decrypt and recover the digital program content.

In the FIG. 7 embodiment, the CPEs 128, 140, are coupled to the modem 120 while CPEs 158, 170 are coupled to modem 150. Each of the CPEs 128, 140, 158, 170 further includes a decryption module and a secure interface which are the same as or similar to the secure interfaces discussed with regard to FIG. 1 embodiment. The secure interfaces may be DLNA certified interfaces which are used for communicating with DLNA certified devices, e.g., speakers and/or other secure output device which protect content from being accessed, copied and/or distributed in unencrypted digital form. In addition to a CPE device (128, 140, 158, 170) and an output device (134, 146, 164, 176), each customer premise 104, 106 includes a secure monitoring device in the FIG. 7 embodiment. As shown in the figure, secure monitoring devices 735, 745, 765 and 775 are coupled to the CPEs 128, 140, 158, and 170 respectively through the secure interfaces. Each secure monitoring device 735, 745, 765 and 775 receives the programming content, e.g., the audio portion of a watermark television program that includes program identifying information in the audio data, from the corresponding CPE 128, 140, 158, and 170 to which the monitoring device 735, 745, 765, or 775 is coupled to, via the secure interface of the corresponding CPE. The content may be, and in some embodiments is, encrypted in the CPEs prior to being supplied to the secure monitoring devices 735, 745, 765 and 775 where it is decrypted and analyzed, e.g., by the viewership monitoring module 724, 725, 754, or 771 included in the monitoring device to identify the content being output by the CPE device. Viewership information identifying the content being viewed is stored in memory, e.g., as viewership information 727, 747, 757 or 773 prior to being supplied to the viewership information server 110 by a communications interface of the secure monitoring device 735. In some embodiments in addition to a memory 812 and the viewership monitoring module 724, the secure monitoring device 735 includes a processor 806 for controlling the secure monitoring device 735 to collect the viewership information 727 and supply it via an interface (e.g., such as the I/O interface 802 and/or a wireless interface 813) to the viewership monitoring server 110. The I/O interface 802 of monitoring device 735 includes a receiver 804 and a transmitter 805 for performing receiving and transmitting operations respectively. The secure interface 808 of the secure monitoring device 735 may be a DLNA interface capable of decrypting audio which is processed by the viewership monitoring module 724. In FIG. 8 embodiment the secure monitoring device 735 includes a decryption module 818 for decrypting content received from the CPE device 128. Thus, the secure monitoring device 735 can decrypt content received from the secure interface 132 of the CPE 128 which may include an encryption module for encrypting content sent over the link to one or more output devices 134 and the secure monitoring device 735. The decrypted content may be in encoded or unencoded form depending on the particular embodiment. The secure monitoring device, in some embodiments, also includes a decoder module 819 for decoding decrypted content which is in encoded rather than unencoded form. The decoder 819 maybe, e.g., an audio and/or video decoder capable of decompressing the content of a compressed audio and/or video stream. The decryption module 818 of secure monitoring device 735 uses security information 836, e.g., decryption keys and/or a shared secret, to decrypt the received content and produce decrypted content 832.

Each of the secure monitoring devices 735, 745, 765 and 775 includes a viewership monitoring module 724, 725, 754, 771 and generated viewership information 727, 747, 757, 773 which is generated by the corresponding viewership monitoring module in the corresponding secure monitoring device. As discussed above with regard to the viewership monitoring modules 124, 125, 159, 171 of system 100, the viewership monitoring modules 724, 725, 754, 771 monitor and collect viewership information in the manner discussed earlier with regard to modules 124, 125, 159, 171. A user at the customer premise 104 may enter into the secure monitoring device 735, e.g., via a keypad on the device 735 or via another input device, the viewership data 834, e.g., the number of users viewing or listening to a program being presented at a particular point in time. Age information for the users may also be entered and included in the collected and stored viewership information along with information identifying the program or programs being observed by the user(s) as determined from the processed content, e.g., watermarked audio content with program identification information, corresponding to broadcast program or other program whether it be an audio program or a combined audio and video program. The generated viewership information 727, 747, 757, and 773 generated by the viewership monitoring modules 724, 725, 754, 771 may, and in some embodiments is, communicated to the viewership information server 110. The functions of various other elements, e.g., the viewership information server, in the FIG. 7 embodiment is the same or similar to those of the FIG. 1 embodiment and thus will not be discussed further.

An exemplary method of collecting presentation, e.g., viewership, information, in accordance with some embodiments comprises: receiving, at a secure device, encrypted program content including audio or video information identifying the program content; operating the secure device to decrypt the encrypted program content to produce decrypted digital program content; operating the secure device to process the decrypted digital program content to recover the information identifying the program content; and generating viewership statistics from the recovered information identifying the program content.

In some embodiments the method further includes communicating the generated viewership statistics to a viewership information server. In some embodiments the method further comprises operating the secure device to receive information indicating a number of viewers to which decrypted content generated from said encrypted program content is being output.

In some embodiments the secure device is a router in a home network. In some such embodiments, operating the secure device to receive information indicating a number of viewers includes receiving input indicating a number of viewers corresponding to a playback device to which the router supplies the encrypted program content or re-encrypted program content generated from the decrypted digital program content.

In some embodiments the method further comprises re-encrypting the decrypted digital program content; supplying the re-encrypted program content to a secure playback device; operating the secure playback device to generate program content by decrypting the received re-encrypted program content; and operating the secure playback device to output said program content to an output device. In some embodiments the output device is integral to the secure playback device or coupled to the secure playback device via a secure communications interface, e.g., an HDMI interface.

In some embodiments the re-encryption operation uses a security information (e.g., encryption key) known to the secure playback device, the re-encryption using different security information e.g., a different encryption key than encryption used to generate said received encrypted program content.

In some other embodiments the secure device is a secure playback device; and operating said secure device to receive information indicating a number of viewers includes receiving user input indicating the number of users viewing the output of said playback device and the age of the individual users. In some such embodiments the secure playback device is a portable playback device including one of a cell phone and a tablet device.

In some embodiments the exemplary method comprises loading a viewership monitoring module onto the secure playback device in response to a user input.

An exemplary secure device, implemented in accordance with some embodiments comprises: an interface including a receiver configured to receive encrypted program content including audio or video information identifying the program content; a decryption module configured to decrypt the encrypted program content to produce decrypted digital program content; a processing module configured to process the decrypted digital program content to recover the information identifying the program content; and a viewership monitoring module configured to generate viewership statistics from the recovered information identifying the program content.

In various embodiments the interface includes a transmitter for communicating the generated viewership statistics to a viewership information server. In various embodiments the receiver is further configured to receive information indicating a number of viewers to which decrypted content generated from said encrypted program content is being output.

In some embodiments the exemplary secure device is a router in a home network, and the receiver is further configured to receive, as part of receiving information indicating a number of viewers, input indicating a number of viewers corresponding to a playback device to which said router supplies said encrypted program content or re-encrypted program content generated from said decrypted digital program content.

In some embodiments the exemplary secure device, further comprises an encryption module configured to re-encrypt said decrypted digital program content; a supply control module configured to supply said re-encrypted program content to a secure playback device; a second decryption module configured to generate program content by decrypting said re-encrypted program content; and a presentation control module configured to output said program content to an output device.

In some embodiments the output device is integral to said secure playback device or coupled to the secure playback device via a secure communications interface. In some embodiments the exemplary encryption module uses security information known to the secure playback device, the encryption module being configured to use different security information for re-encryption than used to generate said received encrypted program content.

In some embodiments the secure device is implemented as a secure playback device; and the receiver is further configured to receive, as part of receiving information indicating a number of viewers, a user input indicating the number of users viewing the output of said playback device and the age of the individual users. In some embodiments the exemplary secure playback device is a portable playback device including one of a cell phone and a tablet device.

In some embodiments the exemplary secure device further comprises a control module for controlling loading of a viewership monitoring module onto said secure playback device in response to a user input.

In various embodiments system elements described herein are implemented using one or more modules which are used to perform the steps corresponding to one or more methods of the present invention, for example, receiving viewership and/or other information; receiving encrypted program content, decrypting the received encrypted program content, processing program content to recover information identifying the program content, generating viewership statistics, storing and/or communicating viewership statistics to an external server.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of collecting presentation information, comprising:
   receiving, at a secure device, encrypted program content including audio or video information identifying the program content;
   operating the secure device to decrypt the encrypted program content to produce decrypted digital program content;
   operating the secure device to process the decrypted digital program content to recover the information identifying the program content;
   receiving default viewer information corresponding to a playback device prior to the playback device outputting the program content; and
   generating viewership statistics from the recovered information identifying the program content, said step of generating viewership information including:
      including in said generated viewership information a default number of viewers corresponding to the playback device in the absence of a user providing viewership information corresponding to said program content.

2. The method of claim 1, further comprising:
   communicating the generated viewership statistics to a viewership information server.

3. The method of claim 2, further comprising:
   operating said secure device to receive from said playback device user provided viewing information indicating a number of viewers to which decrypted content generated from said encrypted program content is being output, said user provided viewing information being received in response to a prompt presented to a user of said output device as part of outputting the program content, said user provided viewing information indicating a different number of viewers than said default number of viewers.

4. The method of claim 3,
   wherein said secure device is a router in a home network; and
   wherein operating said secure device to receive information indicating a number of viewers includes receiving input indicating a number of viewers corresponding to a playback device to which said router supplies said encrypted program content or re-encrypted program content generated from said decrypted digital program content.

5. The method of claim 4, further comprising:
   re-encrypting said decrypted digital program content;
   supplying said re-encrypted program content to a secure playback device;
   operating the secure playback device to generate program content by decrypting said re-encrypted program content; and
   operating the secure playback device to output said program content to an output device.

6. The method of claim 5, wherein said output device is integral to said secure playback device or coupled to said secure playback device via a secure communications interface.

7. The method of claim 6, wherein said re-encryption uses a security information known to the secure playback device, said re-encryption using different security information than encryption used to generate said received encrypted program content.

8. The method of claim 3,
   wherein said secure device is a secure playback device; and
   wherein operating said secure device to receive information indicating a number of viewers includes receiving user input indicating the number of users viewing the output of said playback device and the age of the individual users.

9. The method of claim 1, wherein said audio or video information is a watermark identifying the program content; and
   wherein said secure playback device is a portable playback device including one of a cell phone and a tablet device.

10. The method of claim 9, further comprising:
    loading a viewership monitoring module onto said secure playback device in response to a user input.

11. A secure device, comprising:
    an interface including a receiver to receive encrypted program content including audio or video information identifying the program content;
    a decryption module to decrypt the encrypted program content to produce decrypted digital program content;
    a processing module to process the decrypted digital program content to recover the information identifying the program content;
    wherein said receiver receives default viewer information corresponding to a playback device prior to said playback device outputting said program content; and
    a viewership monitoring module to generate viewership statistics from the recovered information identifying the program content, said viewership monitoring module to include in said generated viewership information a default number of viewers corresponding to the playback device in the absence of a user providing viewership information corresponding to said program content.

12. The secure device of claim 11,
wherein said interface includes a transmitter for communicating the generated viewership statistics to a viewership information server.

13. The secure device of claim 11, wherein said receiver further receives from said playback device user provided viewing information indicating a number of viewers to which decrypted content generated from said encrypted program content is being output, said user provided viewing information being received in response to a prompt presented to a user of said output device as part of outputting the program content, said user provided viewing information indicating a different number of viewers than said default number of viewers.

14. The secure device of claim 13,
wherein said secure device is a router in a home network; and
wherein said receiver further receives, as part of receiving information indicating a number of viewers, input indicating a number of viewers corresponding to a playback device to which said router supplies said encrypted program content or re-encrypted program content generated from said decrypted digital program content.

15. The secure device of claim 14, further comprising:
an encryption module to re-encrypt said decrypted digital program content;
a supply control module to supply said re-encrypted program content to a secure playback device;
wherein said secure playback device includes a second decryption module to generate program content by decrypting said re-encrypted program content; and
wherein said secure playback device includes a presentation control module to output said program content to an output device.

16. The secure device of claim 15, wherein said output device is integral to said secure playback device or coupled to said secure playback device via a secure communications interface.

17. The secure device of claim 16, wherein said encryption module uses security information known to the secure playback device, said encryption module uses different security information for re-encryption than used to generate said received encrypted program content.

18. The secure device of claim 13, wherein said secure device is a secure playback device; and
wherein said receiver further receives, as part of receiving information indicating a number of viewers, a user input indicating the number of users viewing the output of said playback device and the age of the individual users.

19. The secure device of claim 18, wherein said secure playback device is a portable playback device including one of a cell phone and a tablet device.

20. The secure device of claim 19, further comprising:
a control module for controlling loading of a viewership monitoring module onto said secure playback device in response to a user input.

* * * * *